United States Patent
Beshgetoor

[15] 3,666,184
[45] May 30, 1972

[54] SPREADING DEVICE
[72] Inventor: Ray V. Beshgetoor, Merchantville, N.J.
[73] Assignee: Be-Mo Machine Co., Kalamazoo, Mich.
[22] Filed: Oct. 15, 1970
[21] Appl. No.: 44,778

[52] U.S. Cl..............................239/512, 239/684, 239/687
[51] Int. Cl............................................................B05b 1/26
[58] Field of Search..................239/681, 682, 683, 684, 687, 239/505, 507, 512; 222/181, 564

[56] References Cited
UNITED STATES PATENTS

| 401,768 | 4/1889 | Tigner | 239/687 X |
|---|---|---|---|
| 3,441,225 | 4/1969 | Cotter et al. | 239/687 X |
| 3,371,870 | 3/1968 | Harrer | 239/687 X |
| 2,955,828 | 10/1960 | Kinsella | 239/687 X |

*Primary Examiner*—M. Henson Wood, Jr.
*Assistant Examiner*—Edwin D. Grant
*Attorney*—Robert K. Youtie

[57] ABSTRACT

A device for spreading gravitationally falling particulate material wherein support means is located in the path of the falling material, a rotary drive member upstands from the support means, and an upwardly tapering distribution member is removably engaged in driven relation on the drive member for gravitationally receiving falling material and centrifugally impelling the material.

6 Claims, 4 Drawing Figures

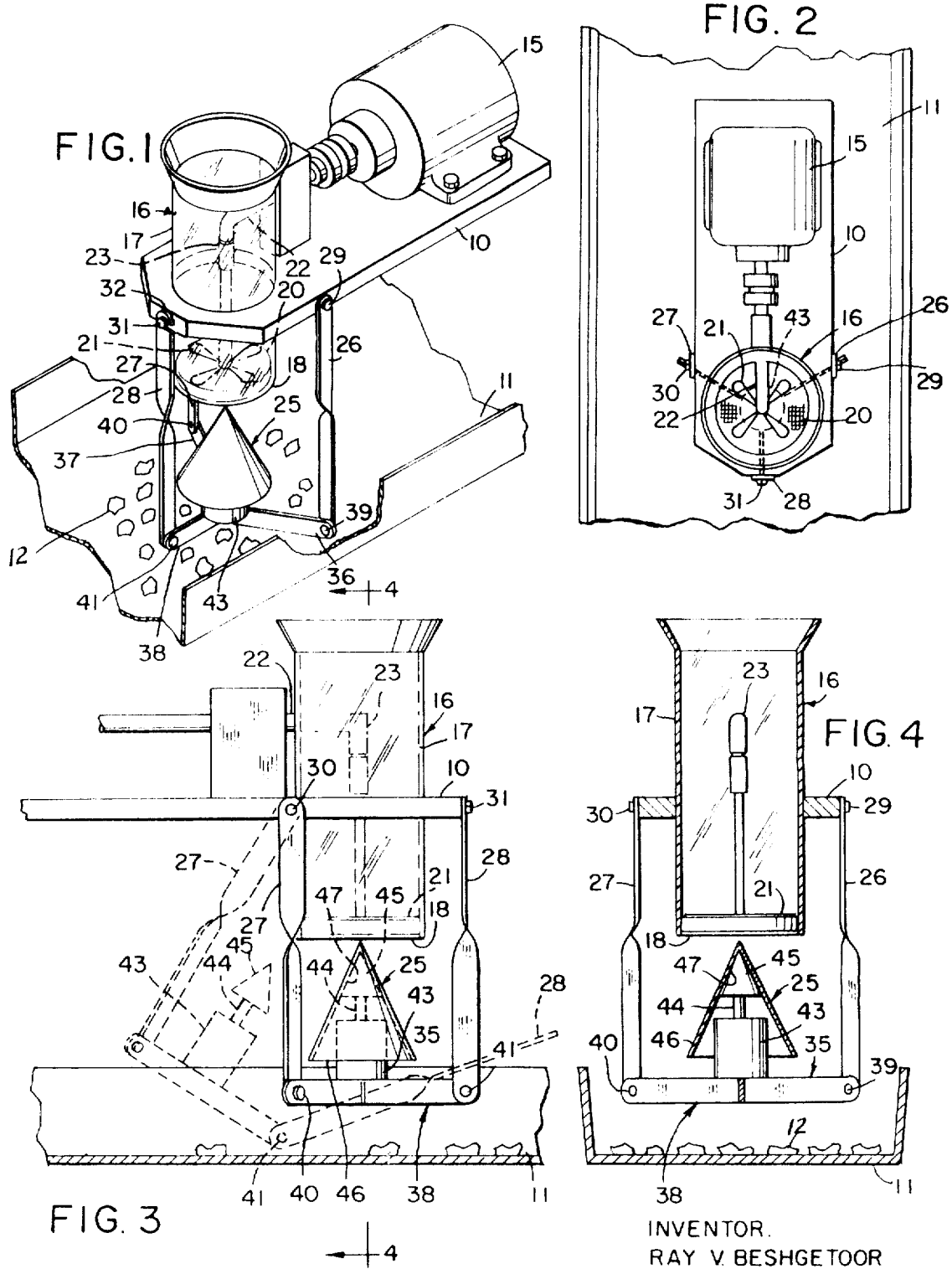
INVENTOR.
RAY V. BESHGETOOR
BY Robert K. Youtie
ATTORNEY.

SPREADING DEVICE

BACKGROUND OF THE INVENTION

While the spreading device of the present invention has been primarily developed and employed in conjunction with food processing equipment, and specifically in the spreading of powders such as barbecue powder, over potato chips, chickens, and the like, it is appreciated that the instant spreading device is capable of many varied applications, all of which are intended to be comprehended herein.

In the prior art, the dispensing of particulate material, such as seasoning powders in food processing, has been accomplished primarily by a "flour sifter" type dispenser for gravitationally dispensing the material over moving potato chips, or other foods. Such a dispensing device is shown in prior U.S. Pat. No. 3,152,010 to Case.

Recent new models of automatic weighing and packaging machines achieving increased acceptance by the trade have conveyors or chutes of greater widths than heretofore used, so that it is necessary to employ plural dispensers or larger dispensers for applying seasoning to the food being conveyed.

SUMMARY OF THE INVENTION

It is an important object of the present invention to provide a unique spreading device for use in the food processing field, and in other applications, wherein falling particulate material may be evenly spread about for reasonably even distribution thereof to articles passing below.

It is another object of the present invention to provide a spreading device for particulate material having the advantageous characteristics mentioned in the preceding paragraph, which is extremely simple in construction for economy and durability, which operates at relatively low speeds and continuous unidirectional movement to avoid the need for vibrators, and which permits of quick and easy removal and replacement of parts, as for sanitation requisite to food processing apparatus.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a top perspective view illustrating a spreading device of the present invention in operative association with food processing equipment.

FIG. 2 is a top plan view of the apparatus shown in FIG. 1.

FIG. 3 is a side elevational view showing the apparatus of FIG. 1, and illustrating a maintenance position in phantom.

FIG. 4 is a sectional elevational view taken generally along the line 4—4 of FIG. 3.

DESCRIPTION OF THE PREFERRED EMBODIMENT

Referring now more particularly to the drawings, and specifically to FIG. 1 thereof, a mounting member or plate 10 may be disposed generally horizontally and suitably fixed in spaced relation over a conveyor or trough 11 in which are being conveyed potato chips 12, or other product to which particulate material is to be applied. The mounting plate 10 may carry a motive means, such as a motor 15, and a dispenser 16. The dispenser 16 may consist of a vertically disposed container 17, such as a cylindrical, open ended body having its lower end 18 projecting beneath the plate 10, and its upper end 19 flared to facilitate reception therethrough of material to be spread. Further, the open lower end 18 of the dispenser 16 may be provided with a strainer or screen 20 extending across the lower end of the tubular body 17, and may be further provided with a rotary agitator 21 superposed directly on the screen 20, in the manner of a flour sifter. The drive means 15 may include a shaft 22 extending into the dispenser 16, and having a rotary extension 23 depending within the body 17 to the agitator 21 for rotatably driving the latter. As thus far described, the dispenser 16 is similar to that conventionally employed and disclosed in the Case U.S. Pat. No. 3,152,010.

Suspended beneath the mounting plate 10, and specifically beneath the dispenser 16, is a spreading device, generally designated 25, constructed in accordance with the teachings of the instant invention. The spreading device 25 is interposed between the dispenser 16 and the conveying means 11 for spreading particulate material gravitationally falling from the dispenser 16 onto the product carried by the conveyor means.

More specifically, the spreading device 25 includes a plurality of depending elongate suspension elements or frame members, as at 26, 27 and 28. The depending frame members 26 and 27 are located on opposite sides of the mounting plate 10, having their upper ends pivotally connected, as by pivotal supports 29 and 30, to the mounting plate. The pivotal supports 29 and 30 may include pins extending in substantial alignment with each other through the upper ends of respective frame members or links 26 and 27 into opposite side edges of the horizontal mounting plate 10. The remaining frame member or depending link 28 is connected to the adjacent end edge of mounting plate 10, as by a fastener 31, and is formed at its upper end region with a hook 32 for suspension from the fastener 31 and selective disengagement therefrom. Further, the spreading device 25 may include a support means, generally designated 35 and located between the lower end regions of the depending frame members 26, 27 and 28. The support means may be defined by an open structure, say of radially outwardly extending members or arms 36, 37 and 38. The arms 36, 37 and 38 of open structure 35 may be rigidly secured together and extend radially outwardly in approximately equiangularly spaced relation, so as to terminate, respectively, proximate to the frame members 26, 27 and 28. Further, the arms of open structure 35 are respectively connected, as by fasteners 39, 40 and 41 to the lower regions of respective frame members 26, 27 and 28. In practice, the frame members 26–28 and arms 36–38 may all be advantageously fabricated of elongate strips or bar stock, the strips of arms 36–38 being preferably arranged in vertical planes so as to obstruct a minimum of downwardly falling particulate material, while the strips or bar stock of frame members 26–28 may be twisted, as required, for suitable fastening to the mounting plate 10 and open structure 35.

The apex of open structure 35, at the juncture of arms 36, 37 and 38, is advantageously located in substantially vertical alignment with the axis of vertical dispenser 16. In addition, suitable drive means, such as a sealed electric motor 43 may be fixed on the open structure 35, centrally thereof, in vertically disposed position, as seen in solid lines in FIGS. 3 and 4. Suitable electrical connections are provided (not shown) for energizing the drive motor 43. Upstanding from the upper end of the drive motor 43, coaxially therewith, is a rotary drive member or shaft 44, preferably having its upper end upwardly tapering, as at 45. The angle of taper of the upper free end 45 of drive spindle 44 is relatively large, for a purpose appearing more fully hereinafter.

Superposed on the drive shaft or spindle 44, surrounding the latter and the upper region of drive motor 43 is a distribution member, generally designated 46. The distribution member is advantageously of an externally conical configuration, being interiorly hollow, as best seen in FIG. 4 so as to completely enclose the drive shaft or spindle 44 and upper region of motor 43. More specifically, the conical distribution member 46 has its interior region, in the apex thereof, as at 47, tapered in general conformance with the tapered upper end region 45 of drive spindle 44. Thus, the distribution member 46 is adapted to seat conformably on the drive spindle 44, having its external conical configuration coaxial with the drive spindle and gravitationally retained in this coaxial relation. The frictional engagement of the internal apex region 47 of distribution member 46 on the tapered upper end region 45 of drive spindle 44 is sufficient to effect rotative driving of the distribution member by the drive spindle, for purposes appearing presently. Moreover, the angle of taper at which the distribution member 46 and drive spindle 44 engage is sufficiently large to avoid any binding action therebetween.

In practice, the exterior cone angle of distribution member 46 was not found critical, but may be varied within reasonable limits depending upon the spread or "throw-out" desired. Also, the speed of rotation of distribution member 46 was not found critical, but satisfactory results may be achieved at relatively low speeds, say between 240 and 360 revolutions per minute, so that the stresses are low and useful life may be long. The angular speed of distribution member rotation may be varied to suit the circumstances. While any suitable drive motor 43 may be employed, it was found in practice desirable to utilize a D.C. motor operating through a rectifier, and also with a rheostat or potentiometer in the armature circuit. In this manner, the power requirements are extremely low, on the order of 10 watts.

The most advantageous speed of distribution member rotation can be readily achieved by a few moments of experimentation, the speed being increased sufficiently so that the falling particulate material does not build up or aggregate on the distribution member and tend to break off as a mass. Such accidental overdoses of seasoning cannot be tolerated in a food product. On the other hand, the desirable speed of distribution member rotation is less than that at which the support structure develops any appreciable vibration or throws the particulate material excessively.

While a variety of materials may be employed for the external surface of the distribution member 46, stainless steel has been found advantageous for its ease of maintaining sanitary. If desired, the stainless steel exterior of distribution member 46 may be coated with teflon. However, other suitable materials, such as various metals or plastics, may be employed for the distribution member 46, if desired.

In use, the particulate material to be spread, such as seasoning powder, is deposited in the dispenser 16, from which it is gravitationally dispensed through the open lower end 18, in the conventional manner. The free falling particulate material falls onto the externally conical surface of distribution member 46, where centrifugal force is imparted to the particles by rotation of the distribution member. This centrifugal force, together with gravitational force disperses the particulate matter downwardly and outwardly in a substantially evenly distributed pattern onto the nether product 12.

As will be appreciated, removal and replacement of the distribution member 46, as for cleaning, or the like, may be frequently required. This is very easily and quickly achieved by merely unhooking the upper end portion 32 of depending frame member 28 from fastener 31, and swinging the spreading device rearwardly, to its phantom position shown in FIG. 3. It will there be observed that the distribution member 46 is readily accessible to an operator, there being sufficient clearance for its elevation and removal from driven engagement seated on the drive spindle free end 45. After cleaning, the distribution member 46 may be replaced on the drive spindle free end 45, being self-aligning in its driven engagement and the spreading device returned to its operative position for continued use.

From the foregoing, it is seen that the present invention provides a spreading device for particulate material which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention.

What is claimed is:

1. A spreading device for spreading gravitationally falling particulate material, said device comprising support means for location in the path of falling material, an upstanding rotary drive member on said support means, an upwardly tapering distribution member engageable in driven relation on said drive member for rotation thereby, particles falling onto said distribution member at different radial differences from the axis of rotation being impelled by different centrifugal forces for spreading of the material, a fixed structure, and a dispenser on said fixed structure for gravitationally dispensing said particulate material, said support means comprising a plurality of frame members connected to and depending from spaced locations on said fixed structure, and an open structure extending between the lower regions of said frame members for supporting said drive member, said frame members being swingable and detachably connected to said fixed structure, for swinging of said open structure away from said dispenser for removal and displacement of said distribution member.

2. A spreading device according to claim 1, said open structure comprising a plurality of radially extending members respectively connected to the lower region of said frame members.

3. A spreading device according to claim 1, said frame members comprising at least three in number, two of said frame members being swingably connected to said fixed structure, and the remaining frame member being detachably connected to said fixed structure, for swinging of said open structure away from said dispenser for removing and replacing said distribution member.

4. A spreading device according to claim 3, said distribution member having an externally conical configuration.

5. A spreading device for spreading gravitationally falling particulate material, said device comprising support means for location in the path of falling material, an upstanding rotary drive member on said support means, and an upwardly tapering distribution member engageable in driven relation on said drive member for rotation thereby, whereby particles falling onto said distribution member at different radial distances from the axis of rotation are impelled by different centrifugal forces for spreading of the material, said drive member comprising an upwardly tapering spindle, and said distribution member being internally tapered for conformable seating on said spindle in said driven relation.

6. A spreading device according to claim 5, the taper of said spindle and the internal taper of said distribution member being sufficiently great to prevent binding action therebetween in said driven relation, to facilitate removal and replacement of said distribution member.

* * * * *